United States Patent Office 2,766,118

Patented Oct. 9, 1956

2,766,118

LIGHT-SENSITIVE MATERIAL FOR THE PHOTO-MECHANICAL REPRODUCTION AND PROCESS FOR THE PRODUCTION OF IMAGES

Oskar Sus and Maximilian Paul Schmidt, Wiesbaden-Biebrich, Germany, assignors, by mesne assignments, to Azoplate Corporation, Summit, N. J., a corporation of New Jersey No Drawing. Application September 30, 1953, Serial No. 383,407

Claims priority, application Germany October 1, 1952

22 Claims. (Cl. 95—7)

The present invention relates to the field of photomechanical reproduction. More particularly it relates to light-sensitive material for use in photomechanical reproduction, wherein hydrazine derivatives are used as the light-sensitive substance, and to the process of making printing plates from light-sensitive material consisting of a base and a light-sensitive layer containing said hydrazine derivatives as light-sensitive substances.

Light-sensitive material for duplication by means of photomechanical processes has recently come into wide commercial usage. Such material includes a support carrying a light-sensitive coating, the support being usually a metal sheet, and preferably an aluminum sheet. It has previously been the practice to employ in the light-sensitive coating, a colloid layer which was prepared by embedding finely divided light-sensitive substances into a colloid material. Such colloid layers harden under the influence of light-rays and usually impart oleophilic properties to those areas which are light exposed. It has recently been proposed to use a light-sensitive material free from such colloid components and employing light-sensitive substances solely. Since the above referred to method for the reproduction of copies usually involves a printing process in which greasy ink is used, it is necessary to use only such light-sensitive substances for the formation of the light-sensitive coating which initially, or after exposure to actinic light, accept greasy ink.

We have now found that certain hydrazine derivatives, when employed in the light-sensitive coating, enable the reproduction of numerous copies by the aforementioned method, with excellent results. Such hydrazine derivatives are those in which at least one hydrogen atom is substituted by an ortho-quinone-diazide-sulfonyl group, and at least one further hydrogen atom, which is linked to the other nitrogen atom of the hydrazine, is substituted by acyl groups or hydrocarbon radicals. Although we have found that ortho-quinone-diazide-sulfonyl groups of the benzene series are very well suited for the purposes of the invention, we preferably employ the sulfonic acids of ortho-naphthoquinone-diazides.

It is an object of this invention, therefore, to provide a light-sensitive material for photomechanical reproduction. Another object is to provide printing plates comprising a support and an ink-receptive image thereon, wherein the image consists essentially of hydrazine derivatives. Other objects and advantages of this invention will become apparent from a reading of the description following hereinafter.

The hydrazine derivatives to be used in accordance with this invention as light-sensitive substances correspond to one of the general formulas:

(A)

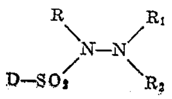

wherein:

D stands for an ortho-quinone-diazide residue,
R stands for a hydrogen atom or a hydrocarbon radical,
$R_1$ stands for a hydrogen atom or a hydrocarbon radical,
$R_2$ stands for an acyl group or hydrocarbon radical, and in which
$R_1$ and $R_2$ may be carbon atoms standing as ring members in the same ring system.

and:

(B)

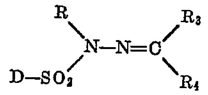

wherein:

D stands for an ortho-quinone-diazide residue,
R stands for a hydrogen atom or a hydrocarbon radical,
$R_3$ stands for a hydrogen atom or a hydrocarbon radical,
$R_4$ stands for a hydrocarbon radical, and in which
$R_3$ and $R_4$ may be carbon atoms standing as ring members in the same ring system.

The ortho-quinone-diazide residue as well as the groups R, $R_1$, $R_2$, $R_3$, or $R_4$ of the compounds to be used in accordance with this invention and the chemical constitution of which corresponds with one of the above mentioned general formulas, may carry substituents. Also, we have found that compounds conforming to formula A wherein $R_2$ stands for an aryl radical when employed as the light-sensitive substance, give good results.

The light-sensitive material is made by producing a layer containing the hydrazine derivatives corresponding to the present invention on a suitable support. The light-sensitive coating is produced by applying a solution of the hydrazine derivatives onto the support, for instance by spreading, spraying or whirlcoating, or, if desired, the solution may also be applied to the support by means of rollers. Metals, such as aluminum or zinc foils or plates, are especially suitable as supports. The layer applied onto the support is well dried. By the use of the light-sources customary in photographic tracing and in printing offices, an image from a transparent pattern is produced on the light-sensitive material. The image is then transformed to a final image by treating the exposed side of the foil with weak alkaline aqueous solutions, preferably secondary or tertiary alkali metal salts of phosphoric acid, e. g. disodium phosphate, trisodium phosphate, etc., and thereafter with acid reacting substances. We have found that alkaline solutions having a pH of at least 9 show particularly good results. Hereinafter when the term "acid reacting substances" is used, it is intended to include solutions containing acids and/or acid salts. In the exposed areas the light-reaction product of the light-sensitive substance is removed by the alkaline developer, while the hydrazine derivative remains in the areas not hit by light. Since the light-sensitive substance is initially oleophilic, and consequently capable of accepting greasy ink, a positive image is obtained from a positive pattern, and if a metal plate or a metal foil is used as a support, the image carrying support is suitable to be used as a printing plate.

If it is desired to use the material of the invention for clichés, or for the production of stencils, the image carrying support obtained above would be subjected to further treatment with etching media in the former instance and would be stamped in the latter instance.

The hydrazine derivatives according to the above-mentioned general formulas may be obtained, for example, by causing ortho-quinone-diazide-sulfonic chlorides to react with acylated hydrazines or with hydrazones of aldehydes and ketones. Their solubility in organic solvents makes them very fit for coating suitable supports, e. g. metal plates.

The light-sensitive hydrazine derivatives, when applied onto the support in the form of a solution in an organic solvent, form a uniform coating on the support. Due to their insolubility in cold water, the coatings produced on the support are not sensitive to the humidity of the air, which favors the storage stability of the light-sensitive material. To prepare the solutions needed for coating, preferably such organic solvents are chosen which are of good volatility, as for example alcohols, alcoholic ethers. Other solvents, such as dioxane and benzene, are likewise suitable.

In order to avoid segregation of crystals in the coating, it may be advantageous sometimes to add crystallization inhibiting agents, e. g. alkali soluble resins, to the sensitizing solutions, or to use mixtures of several hydrazine derivatives for the preparation of the sensitizing solutions.

The following examples are inserted for the purpose of illustrating the present invention, and it is not intended to thereby restrict the scope of the invention to the contents of the examples. Where not otherwise stated, the parts are by weight.

EXAMPLES

*Example 1*

2 parts of the compound corresponding to Formula 1:

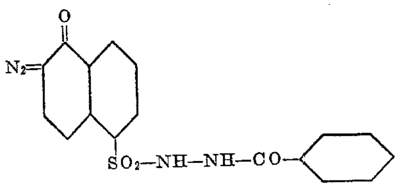

and 1 part of an alkali-soluble non-hardenable phenol-formaldehyde resin novolak, a novolak for example which is sold by the firm "Chemische Werke Albert," in Wiesbaden-Biebrich, under the trade name "Alnovol" (registered trademark in Germany) are dissolved in 100 parts by volume of glycol monomethyl ether, and a mechanically roughened aluminum foil is coated with this solution with the aid of a whirler. The sensitized foil is first dried with hot air, then the drying is continued for 5 minutes at 90° C. Thereafter the foil is exposed under a transparent, positive pattern. In order to find the correct exposure time for various kinds of light-sources, it is advisable to first make a test-exposure using a photometric step wedge. For example, an exposure was carried out with an arc lamp of 18 amp. for 6 minutes at a distance of 70 cm., and the exposed foil was developed by wiping it over with a 15% solution of disodium phosphate. The positive image thus obtained is thereafter treated with an aqueous solution which contains 8% of dextrin, 1% of phosphoric acid, and 1% of formaldehyde, and thereafter inked with greasy ink. The foil may now be used for the production of duplicates in a flat-printing machine.

Good results are also obtained if the compound corresponding to Formula 2:

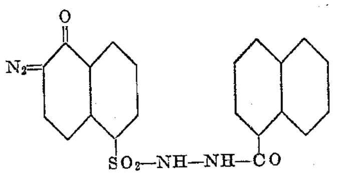

instead of the compound corresponding to Formula 1 is used, in which case the aluminum foil is coated with a 1% solution of the light-sensitive compound without admixture of the phenol-formaldehyde resin.

The compound corresponding to Formula 1 is prepared in the following way:

10 parts of naphthoquinone-(1,2)-diazide-(2)-5-sulfochloride are dissolved in 60 parts by vol. of dioxane, and a solution of 4.5 parts of benzoyl hydrazine in a mixture of 50 parts by volume of dioxane and 4 parts by volume of pyridine is added. After standing for 3 hours, a dark brown oil segregates from the reaction mixture on the bottom of the reaction vessel. The contents of the reaction vessel are mixed with about 1200 parts by volume of water and a quantity of dilute caustic soda solution such that a clear solution will result. This solution is acidified with hydrochloric acid, and then the N-benzoyl-N' - [naphthoquinone - (1,2) - diazide - (2)-5-sulfonyl]-hydrazine segregates as a yellow crystal powder. On heating, the compound decomposes at 210° C. after having previously turned brown.

The compound corresponding to Formula 2 is prepared analogously by causing naphthoquinone-(1,2)-diazide-(2)-5-sulfochloride to react with α-naphthoic acid-hydrazide (melting point 166° C.). On heating the N-α-naphthoyl - N' - [naphthoquinone - (1,2) - diazide - (2)-5-sulfonyl]-hydrazine decomposes at 210° C., after sintering.

*Example 2*

A mechanically roughened aluminum foil is coated with a solution of 2 parts of the compound corresponding to Formula 3:

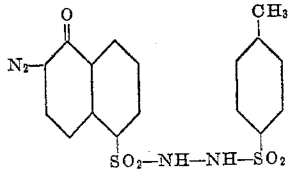

and 1 part of the phenol-formaldehyde resin novolak mentioned in Example 1 in 100 parts by volume of glycol monomethyl ether, and then well dried. After exposure under a positive pattern, the sensitized foil is developed with a 15% solution of disodium phosphate, e. g. by wiping over with a cotton swab soaked with the developing solution. A green-yellow positive image on a clear metallic background is obtained, which is wiped over with a 1% solution of phosphoric acid, and then rubbed in with greasy ink. The foil is then ready for printing.

Similar results are obtained by using the compound corresponding to Formula 4:

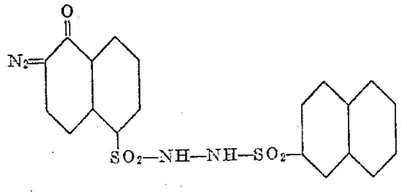

in a 1% solution without admixture of a novolak. Exposure and development for preparing a printing plate are performed as described above.

The compound corresponding to Formula 3 is prepared according to the directions given in Example 1 by condensing equimolecular quantities of naphtho-quinone-(1,2)-diazide-(2)-5-sulfochloride and p-toluene sulfonyl hydrazide in the presence of pyridine. On heating, the N - (p - toluene sulfonyl)-N'-[naphtho-quinone-(1,2)-diazide-(2)-5-sulfonyl]-hydrazine decomposes at 135° C. after having first been sintered. By causing, as described above, naphthoquinone-(1,2)-diazide-(2)-5-sulfochloride to react with β-naphthalene-sulfonyl-hydrazide (which decomposes and melts at a temperature of 136°–138° C.) the compound corresponding to Formula 4 is obtained. On heating in a capillary tube, the N-(β-naphthalene-sulfonyl) - N' - [naphthoquinone - (1,2) - diazide-(2)-5-sulfonyl]-hydrazine begins to decompose slowly at 175° C.

*Example 3*

A mechanically roughened aluminum foil is coated with a 1% solution of the compound corresponding to Formula 5:

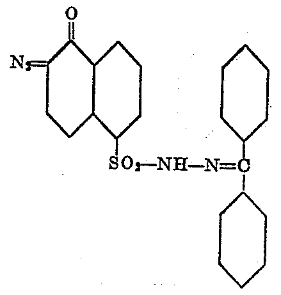

in glycol-monomethyl ether. The dried foil, after exposure under a positive pattern, and development with a 5% solution of disodium phosphate, exhibits a positive image of the pattern, which if thereafter treated with an acid medium, for instance with a solution of monoammonium phosphate, can be inked with greasy ink.

The compound corresponding to Formula 5 is prepared by condensing in dioxane, as a solvent, equimolecular quantities of naphthoquinone-(1,2)-diazide-(2)-5-sulfochloride and benzo-phenone-hydrazone in the presence of pyridine as an acid-binding material.

After evaporation of the solvent under reduced pressure at about 45° C., and while cooling with ice, the remnant is digested with concentrated hydrochloric acid, filtered, and washed with water. The condensation product is purified by dissolving the washed remnant in a dilute caustic soda solution, and then precipitating it again by admixture of hydrochloric acid. The benzophenone-N-[naphthoquinone - (1,2) - diazide - (2) - 5 - sulfonyl]-hydrazone can be recrystallized from ethyl acetate, and on heating in a capillary tube, decomposes slowly, above 90° C.

*Example 4*

A solution of 1 part of the compound corresponding to Formula 6:

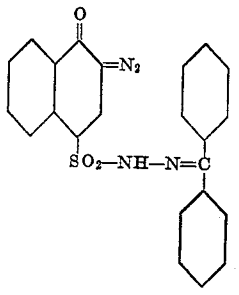

in 100 parts by volume of dimethyl formamide is spread onto an anodically oxidized aluminum foil. The well dried foil is exposed to the light of an arc-lamp under a positive pattern, and then developed by swabbing with a 5% solution of disodium phosphate. A yellow positive image is obtained which, after a short treatment with a 1% phosphoric acid, is inked with greasy ink.

The compound corresponding to Formula 6 is prepared similar to the procedure described in Example 3 by causing naphthoquinone - (1,2) - diazide - (2) - 4 - sulfochloride (decomposition point 148° C.) to react with benzophenone hydrazone. After recrystallization from glacial acetic acid, the benzophenone-N-[naphthoquinone-(1,2)-diazide-(2)-4-sulfonyl] hydrazone, on heating in a capillary tube, decomposes with slowly increasing speed above 175° C., after having previously turned brown.

*Example 5*

A solution of 1% of the compound corresponding to Formula 7:

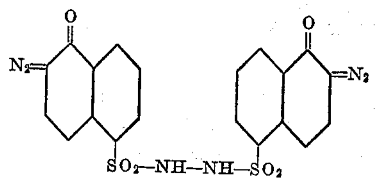

and 0.5% of the phenol-formaldehyde resin novolak as more particularly defined in Example 1, in dimethyl formamide is applied on a mechanically roughened aluminum foil and well dried. The coated foil is exposed underneath a transparent positive pattern, and a positive image of the original is obtained, which is developed by swabbing the exposed side of the foil with a 5% solution of disodium phosphate. Thereafter, the developed foil is treated with an aqueous solution containing 8% of dextrin, 1% of formaldehyde, and 1% of phosphoric acid. The image is rubbed in with greasy ink and may be used as a printing plate.

To obtain the compound corresponding to formula 7, 2.2 moles of naphthoquinone-(1,2)-diazide-(2)-5-sulfochloride are caused to react with 1 mol of hydrazine hydrate in dioxane as a solvent in the presence of 2.2 moles of pyridine. The reaction product is purified by dissolving it in a caustic soda solution and precipitating it again by admixture of hydrochloric acid. The purified N,N'-bis - [naphthoquinone - (1,2) - diazide - (2) - 5 - sulfonyl]-hydrazine has no precisely defined decomposition point, but chars slowly between 150° and 250° C. when heated in a capillary tube.

*Example 6*

A printing plate is produced according to the directions given in Example 2, but the compound corresponding to Formula 8:

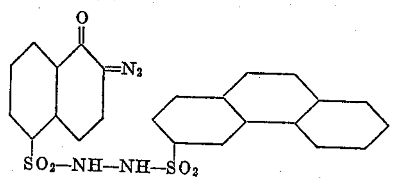

instead of that corresponding to Formula 4, is used.

The compound corresponding to Formula 8, N-[naphthoquinone - (1,2) - diazide - (2) - 5 - sulfonyl] - N'-(phenanthrene-3-sulfonyl)-hydrazine, is prepared in an analogous way conforming to the instructions given in Example 2 for the preparation of the compounds with Formulas 3 and 4. On heating in a capillary tube, the compound corresponding to Formula 8 decomposes at 135° C.

*Example 7*

An aluminum printing plate is prepared according to the directions of Example 5, but using in the present case as a light-sensitive substance for sensitizing, the compound corresponding to Formula 9:

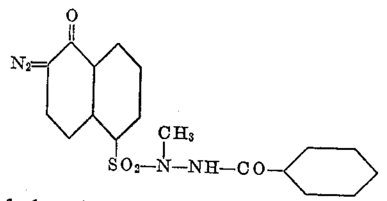

and 1% of phenol-formaldehyde novolak. A 1% to 5% solution of trisodium phosphate is used as developer.

The compound corresponding to Formula 9 is produced as follows:

N - benzoyl - N' - [naphthoquinone - (1,2) - diazide-(2)-5-sulfonyl]-hydrazine (Formula 1) is dissolved in a 3% soda solution applied in excess. While shaking at room temperature, about 2 moles of dimethyl sulfate are added to this solution. Thereby the N-benzoyl-N'-methyl - N' - [naphthoquinone - (1,2) - diazide-(2)-5-sulfonyl] hydrazine is precipitated as a fine, yellow powder, which, opposed to the compound corresponding to Formula 1 to be used as starting material, is insoluble in a 10% soda solution, and which is far less soluble in a dilute caustic soda solution. On heating, the reaction product sinters at 160° C. and decomposes at about 190° C.

*Example 8*

An aluminum foil is coated witth a dioxane solution containing 0.5–1% of one of the compounds corresponding to Formulas 10:

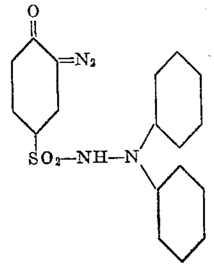

or 11:

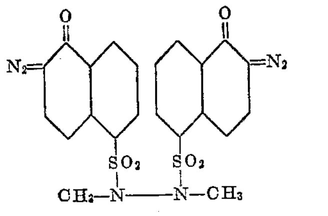

An image is produced on the sensitized foil under a pattern and the image, a positive image from a positive original, is developed with a 5% to 10% solution of disodium phosphate, and then treated with an acid reacting medium, preferably a mono-ammonium phosphate solution.

The compound corresponding to Formula 10 is prepared by condensing benzoxazolone-5-sulfochloride with asymmetrical diphenyl hydrazine. When heating the condensation product (melting point 100° C., with decomposition) with a dilute caustic soda solution, the benzoxazolone ring is broken up and N'-(1-hydroxy-2-amino benzene-4-sulfonyl)-N,N-diphenyl-hydrazine is formed. The last mentioned hydrazine compound will be transformed by diazotisation with a solution of sodium nitrite into the N'-[benzoquinone-(1,2)-diazide-(2)-4-sulfonyl]-N, N-diphenyl-hydrazine. When heated in a capillary tube, this compound begins to sinter at about 75° C., and melts with decomposition at 100° C.

The compound corresponding to Formula 11 is obtained by condensing in a dioxane solution naphthoquinone-(1,2)-diazide-(2)-5-sulfochloride (2 moles) with symmetrical dimethyl hydrazine (1 mol) in the presence of pyridine. After the evaporation of the dioxane under reduced pressure, the yellow, syrupy remnant is digested with dilute hydrochloric acid. Thereby the by-product, resulting from unilateral condensation of naphthoquinone-diazide-sulfochloride with hydrazine, is dissolved, with the N,N'-bis-[naphthoquinone-(1,2)-diazide-(2)-5-sulfonyl]-N,N'-dimethyl-hydrazine remains undissolved. To remove impurities, the main product, which is symmetrically substituted and only slightly soluble in organic solvents, is heated for a short time with alcohol to a boiling condition. When heated in a capillary tube, it changes gradually to brown beginning at 130° C., and decomposes slowly, turning thereafter to black.

*Example 9*

A 1% solution of the compound corresponding to Formula 12:

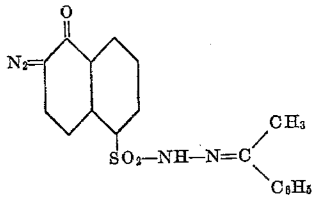

in glycol monomethyl ether is whirlcoated onto a mechanically roughened aluminum foil, and the plate, after a short predrying, is dried for 5 minutes at a temperature of 90° C. by means of a warm air current in order to completely remove the solvent. The thus formed light-sensitive layer is exposed to light under a positive transparent pattern for about 15 to 30 seconds, and the exposed layer is then developed by means of a 5% solution of disodiumphosphate. The green-yellow positive image thus obtained is wiped over with 1% phosphoric acid solution, inked with greasy ink and then available for use as a printing plate.

The compounds of the Formula 13 :

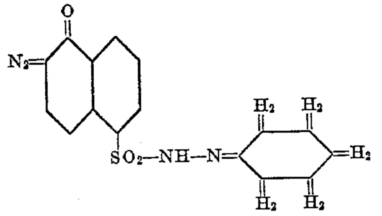

and 14:

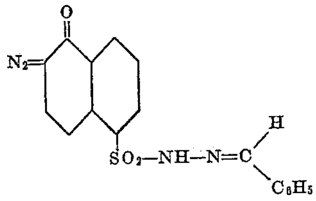

can just as well be used instead of the above-mentioned quinone-diazide. In such a case the development of the image is effected by means of a 1% solution of disodium phosphate.

The quinone-diazides corresponding to Formulas 12, 13 and 14 are obtained according to the directions for producing the compound of Formula 5, given in Example 3.

After being precipitated from its solution in dilute soda lye by addition of hydrochloric acid the compound corresponding to Formula 12 melts under decomposition at a temperature of 200° C. to 205° C.

The compound corresponding to Formula 13 is purified by recrystallization from methyl alcohol. On heating it in a capillary tube, it turns black and chars slowly.

After purification by dissolving it in dilute soda lye and precipitating it by means of hydrochloric acid, the compound corresponding to Formula 14 melts at a temperature of 110° C.

Having thus described our invention, what we desire to claim is:

1. An article for use in the manufacture of photosensitive material comprising a base and a light-sensitive layer coated on said base adapted to being converted into imaged and non-imaged areas, said layer including at least one hydrazine derivative selected from the group consisting of

I.

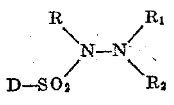

II.

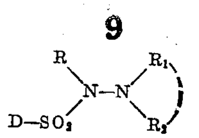

III.

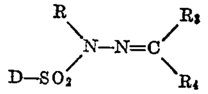

and

IV.

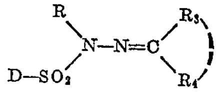

wherein

D=an ortho-quinone-diazide radical

R, $R_1$, $R_3$=a member of the group consisting of H and hydrocarbon radicals $R_2$=a member of the group consisting of acyl and aryl $R_4$=a hydrocarbon radical $R_1$ and $R_2$ in Formula II=carbon atoms standing as ring members in the same ring system, and $R_3$ and $R_4$ in Formula IV=carbon atoms standing as ring members in the same ring system.

2. The article of claim 1 wherein D is selected from the group consisting of ortho-benzoquinone-diazide radicals and ortho-naphthoquinone-diazide radicals.

3. The article of claim 2 wherein D is a naphthoquinone-(1,2)-diazide radical.

4. An article for use in the manufacture of photosensitive material comprising a sheet metal base and a light-sensitive layer coated on said base, said layer consisting of imaged areas and non-imaged areas stabilized against further light decomposition, said imaged areas being comprised of an oleophilic material containing

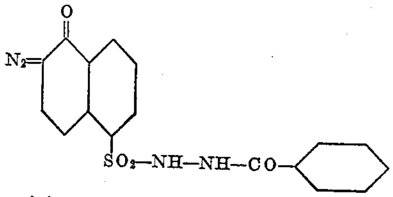

5. An article for use in the manufacture of photosensitive material comprising a sheet metal base and a light-sentive layer coated on said base, said layer consisting of imaged areas and non-imaged areas stabilized against further light decomposition, said imaged areas being comprised of an oleophilic material containing

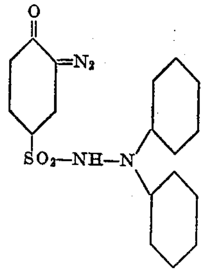

6. An article for use in the manufacture of photosensitive material comprising a sheet metal base and a light-sensitive layer coated on said base, said layer consisting of imaged areas and non-imaged areas stabilized against further light decomposition, said imaged areas being comprised of an oleophilic material containing

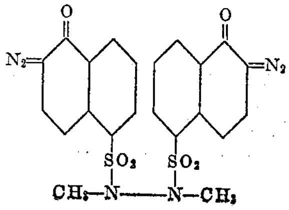

7. An article for use in the manufacture of photosensitive material comprising a sheet metal base and a light-sensitive layer coated on said base, said layer consisting of imaged areas and non-imaged areas stabilized against further light decomposition, said imaged areas being comprised of an oleophilic material containing

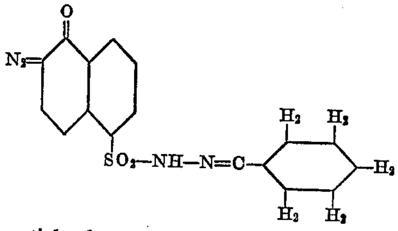

8. An article for use in the manufacture of photosensitive material comprising a sheet metal base and a light-sensitive layer coated on said base, said layer consisting of imaged areas and non-imaged areas stabilized against further light decomposition, said imaged areas being comprised of an oleophilic material containing

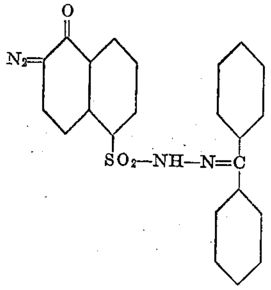

9. The process for forming plates for use in photomechanical reproduction comprising the steps of coating a base with a light sensitive layer including hydrazine derivatives selected from the group consisting of

I.

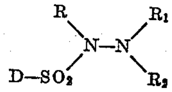

II.

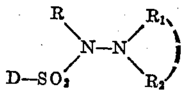

III.

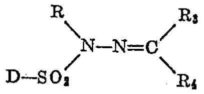

and

IV.

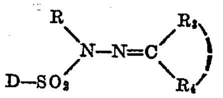

wherein

D=an ortho-quinone-diazide radical

R, $R_1$, $R_3$=a member of the group consisting of H and hydrocarbon radicals $R_2$=a member of the group consisting of acyl and aryl $R_4$=a hydrocarbon radical $R_1$ and $R_2$ in Formula II=carbon atoms standing as ring members in the same ring system, and $R_3$ and $R_4$ in Formula IV=carbon atoms standing as ring members in the same ring system, exposing said light-sensitive layer to light under a pattern to decompose said compound in the light-struck areas and treating the exposed layer with a dilute alkali solution to remove the decomposed compound.

10. The process of claim 9 wherein the developed plate is thereafter treated with a solution containing an acid reacting substance.

11. The process of claim 9 wherein the alkaline solution is selected from the group consisting of secondary and tertiary alkali metal salts of phosphoric acid.

12. The process of claim 9 wherein D is taken from the group consisting of ortho-benzoquinone-diazide radicals and ortho-naphtho-quinone diazide radicals.

13. An article for use in the manufacture of printing plates comprising a base and a light-sensitive layer coated on said base adapted to being converted into imaged and non-imaged areas, said layer containing

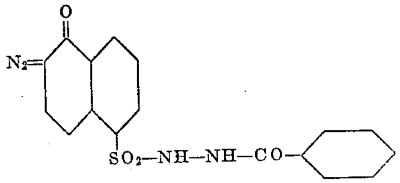

14. An article for use in the manufacture of printing plates comprising a base and a light-sensitive layer coated on said base adapted to being converted into imaged and non-imaged areas, said layer containing

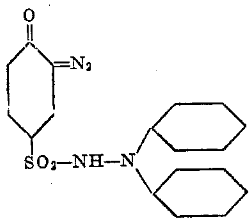

15. An article for use in the manufacture of printing plates comprising a base and a light-sensitive layer coated on said base adapted to being converted into imaged and non-imaged areas, said layer containing

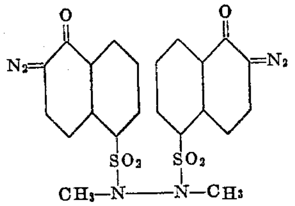

16. An article for use in the manufacture of printing plates comprising a base and a light-sensitive layer coated on said base adapted to being converted into imaged and non-imaged areas, said layer containing

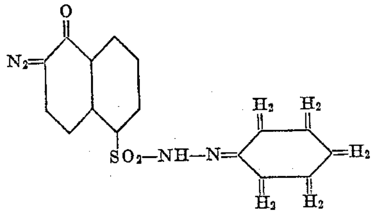

17. An article for use in the manufacture of printing plates comprising a base and a light-sensitive layer coated on said base adapted to being converted into imaged and non-imaged areas, said layer containing

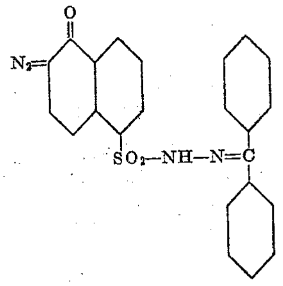

18. The process for forming plates for use in photomechanical reproduction comprising the steps of coating a base with a light-sensitive layer including

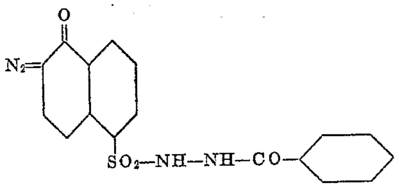

exposing said light-sensitive layer to light under a pattern to decompose said layer in the light struck areas and treating the exposed layer with a dilute alkaline solution to remove the decomposition products from the light struck areas.

19. The process for forming plates for use in photomechanical reproduction comprising the steps of coating a base with a light-sensitive layer including

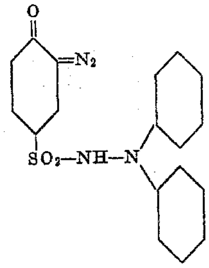

exposing said light-sensitive layer to light under a pattern to decompose said layer in the light struck areas and treating the exposed layer with a dilute alkaline solution to remove the decomposition products from the light struck areas.

20. The process for forming plates for use in photomechanical reproduction comprising the steps of coating a base with a light-sensitive layer including

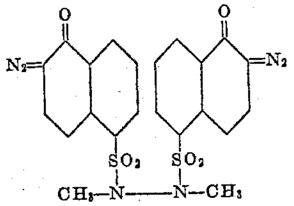

exposing said light-sensitive layer to light under a pattern to decompose said layer in the light struck areas and treating the exposed layer with a dilute alkaline solution to remove the decomposition products from the light struck areas.

21. The process for forming plates for use in photomechanical reproduction comprising the steps of coating a base with a light-sensitive layer including

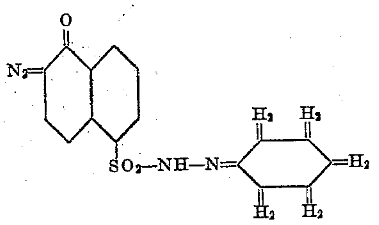

exposing said light-sensitive layer to light under a pattern to decompose said layer in the light struck areas and treating the exposed layer with a dilute alkaline solution to remove the decomposition products from the light struck areas.

22. The process for forming plates for use in photomechanical reproduction comprising the steps of coating a base with a light-sensitive layer including

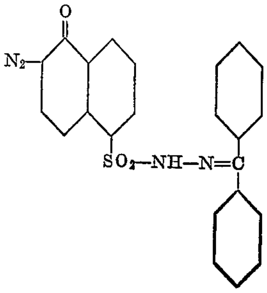

exposing said light-sensitive layer to light under a pattern to decompose said layer in the light struck areas and treating the exposed layer with a dilute alkaline solution to remove the decomposition products from the light struck areas.

References Cited in the file of this patent

FOREIGN PATENTS

| | | |
|---|---|---|
| 497,135 | Belgium | Nov. 16, 1950 |
| 500,222 | Belgium | Jan. 15, 1951 |